United States Patent
Anand (10) Patent No.: US 10,467,840 B2
(45) Date of Patent: Nov. 5, 2019

(54) METHOD FOR AUTOMATED AUTHENTICATION OF A SECURITY LABEL

(71) Applicant: Ashish Anand, Bangalore (IN)

(72) Inventor: Ashish Anand, Bangalore (IN)

( * ) Notice: Subject to any disclaimer, the term of this patent is extended or adjusted under 35 U.S.C. 154(b) by 0 days.

(21) Appl. No.: 15/992,242

(22) Filed: May 30, 2018

(65) Prior Publication Data

US 2018/0276931 A1 Sep. 27, 2018

Related U.S. Application Data (63) Continuation-in-part of application No. 15/316,847, filed on Dec. 7, 2016, now Pat. No. 10,074,228.

(51) Int. Cl.

| | |
|---|---|
| *G07D 7/005* | (2016.01) |
| *G06T 7/90* | (2017.01) |
| *G06T 7/00* | (2017.01) |
| *B42D 25/30* | (2014.01) |
| *G06K 9/22* | (2006.01) |
| *G07D 7/12* | (2016.01) |
| *G07D 7/00* | (2016.01) |
| *G07D 7/1205* | (2016.01) |
| *G06K 9/00* | (2006.01) |

(52) U.S. Cl.
CPC ........... *G07D 7/0056* (2017.05); *B42D 25/30* (2014.10); *G06T 7/90* (2017.01); *G06T 7/97* (2017.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 7,581,683 | B2* | 9/2009 | Walmsley | G06K 1/121 |
| | | | | 235/454 |
| 7,982,929 | B2* | 7/2011 | Silverbrook | G06K 19/06037 |
| | | | | 235/375 |
| 8,740,076 | B2* | 6/2014 | Anand | G06K 7/10 |
| | | | | 235/454 |
| 9,361,532 | B2 | 6/2016 | Anand | |
| 10,061,956 | B1* | 8/2018 | Mishra | G06K 19/06 |
| 2004/0056097 | A1* | 3/2004 | Walmsley | G06K 1/121 |
| | | | | 235/454 |
| 2007/0086653 | A1* | 4/2007 | Javidi | G06K 7/1421 |
| | | | | 382/181 |
| 2013/0163818 | A1* | 6/2013 | Rosset | G07D 7/128 |
| | | | | 382/103 |

(Continued)

OTHER PUBLICATIONS

U.S. Appl. No. 14/252,392, filed Aug. 7, 2014, Linksmart Technologies PVT. L.

(Continued)

*Primary Examiner* — Shawn Decenzo (57) ABSTRACT

A method for automated authentication of a security label comprises capturing a first image of the security label under a first lighting condition and capturing at least a second image of the security label under a second lighting condition. Further, the first image and the second image are verified to check whether the first image and the second image meet pre-defined expectation under the first lighting condition and the second lighting condition respectively. Authenticity of the security label is confirmed by the processor if the expectation is met.

18 Claims, 7 Drawing Sheets

(56) References Cited

U.S. PATENT DOCUMENTS

| | | | | |
|---|---|---|---|---|
| 2013/0306737 A1* | 11/2013 | Freeman | ........ | G06K 19/06037 235/488 |
| 2014/0300095 A1* | 10/2014 | Tompkin | ................ | B42D 25/00 283/67 |
| 2015/0246571 A1* | 9/2015 | Bielesch | ................ | B42D 25/29 283/85 |
| 2015/0332109 A1* | 11/2015 | Anand | .................... | G06K 7/10 382/195 |
| 2016/0085955 A1* | 3/2016 | Lerner | .................... | G06F 21/31 726/20 |
| 2017/0200035 A1* | 7/2017 | Teraura | .............. | G06K 7/10742 |
| 2018/0241856 A1* | 8/2018 | Cho | .................... | G06K 19/005 |
| 2018/0304669 A1* | 10/2018 | Godfrey | ................ | B42D 25/46 |

OTHER PUBLICATIONS

U.S. Appl. No. 13/521,733, Ashish Anand.
U.S. Appl. No. 13/590,871, filed Jan. 10, 2013, Ashish Anand.
U.S. Appl. No. 15/316,847, filed Dec. 7, 2016, Selfdot Technologies (OPC) P.

\* cited by examiner

METHOD FOR AUTOMATED AUTHENTICATION OF A SECURITY LABEL

CROSS-REFERENCE TO RELATED APPLICATIONS

This application is a continuation-in-part of application Ser. No. 15/316,847, filed on Dec. 7, 2016

BACKGROUND

Unless otherwise indicated herein, the materials described in this section are not prior art to the claims in this application and are not admitted to being prior art by inclusion in this section.

FIELD OF THE INVENTION

The subject matter in general relates to security labels. More particularly, but not exclusively, the subject matter relates to authenticating security labels by an automated method.

DISCUSSION OF THE RELATED ART

The growing threat of counterfeit objects is one of the critical concern worldwide. Applying security labels over objects has been a widely accepted practice to address the problem of counterfeiting. However, it is also known that even security labels are counterfeited. Therefore, over the years various types of security labels have been introduced to make counterfeiting challenging. Some of these labels have spatial distribution of colour. The colour distribution from the perspective of a viewer may change based on the viewing angle, based on which a human inspector may judge whether the label is genuine or not. Likewise, some of the colour profile may be made visible under certain lighting condition. A human inspector may inspect the label under such lighting condition and determine whether the label is genuine or not.

The approaches discussed above may work to some extent if the human inspector is functioning without any connivance. However, in industrial set-ups, the person inspecting may also be compromised. The inspector can work around the process to generate false negative or false positive results. As an example, in case the inspector is using a scanning device to determine the genuineness of the label, the inspector may swap original label with a duplicate label and vice versa and may alter the viewing angle of the scanning device to generate false negative, among other methods of gaming the process.

Apart from the challenges discussed above, duplication of an original label may be done by means of photocopying. In some cases, labels are made such that the label gets damaged on photocopying. However, even such safeguards have been circumvented. As an example, in case of such labels, a photograph of the label is captured, and thereafter a physical copy of the label is produced using the photograph. Conventional methods do not appear to address such circumvention of security measures.

In view of the forgoing discussion, there is a need for an improved method of authenticating security labels.

SUMMARY

In an embodiment, a method for automated authentication of a security label comprises capturing at least a first image of the security label under a first lighting condition, using an image capturing device and at least a second image of the security label under a second lighting condition, using the image capturing device, wherein the first lighting condition is different from the second lighting condition. The method further comprises verifying by a processor, using the first image and the second image whether predefined expectation is met. Further, the method comprises confirming, by the processor, authenticity of the security label if the expectation is met.

In another embodiment, a method for automated authentication of the security label comprises capturing at least a first image of the security label under a first condition and at least a second image of the security label under a second condition, using an image capturing device, wherein relative tilt between the camera of the image capturing device and the security label is the first condition is different from the second condition. The method further comprises verifying by a processor, using the first image and the second image whether predefined expectation is met and confirming by the processor, authenticity of the security label if the expectation is met.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

It should be understood that the capabilities of the invention described in the present disclosure and elements shown in the figures may be implemented in various forms of hardware, firmware, software, recordable medium or combinations thereof.

Overview

In an embodiment, a method to automate authentication of security labels is disclosed. The method may comprise capturing a first image and a second image of a security label in a first lighting condition and a second lighting condition, respectively, using an image capturing device, such as a smartphone. The first lighting condition may correspond to the condition when flash light of image capturing device is OFF. The second lighting condition may correspond to the condition when flash light of the image capturing device is turned ON.

The first image and the second image may be verified by a processor to check whether the first image and the second image are meeting the predefined expectation of first lighting condition and second lighting condition One or more intermediate images may be captured, in between the first and the second images, to ensure that the security label is not replaced before the second image is captured. The image capturing device may determine whether the security label is genuine or not using the first image, the intermediate images and the second image.

In an alternate embodiment, the first image and the second image are captured under different relative tilts between the image capturing device and the security label. The intermediate images may be captured during the transition between the different relative tilts.

Image Capturing Device

Figure 1:
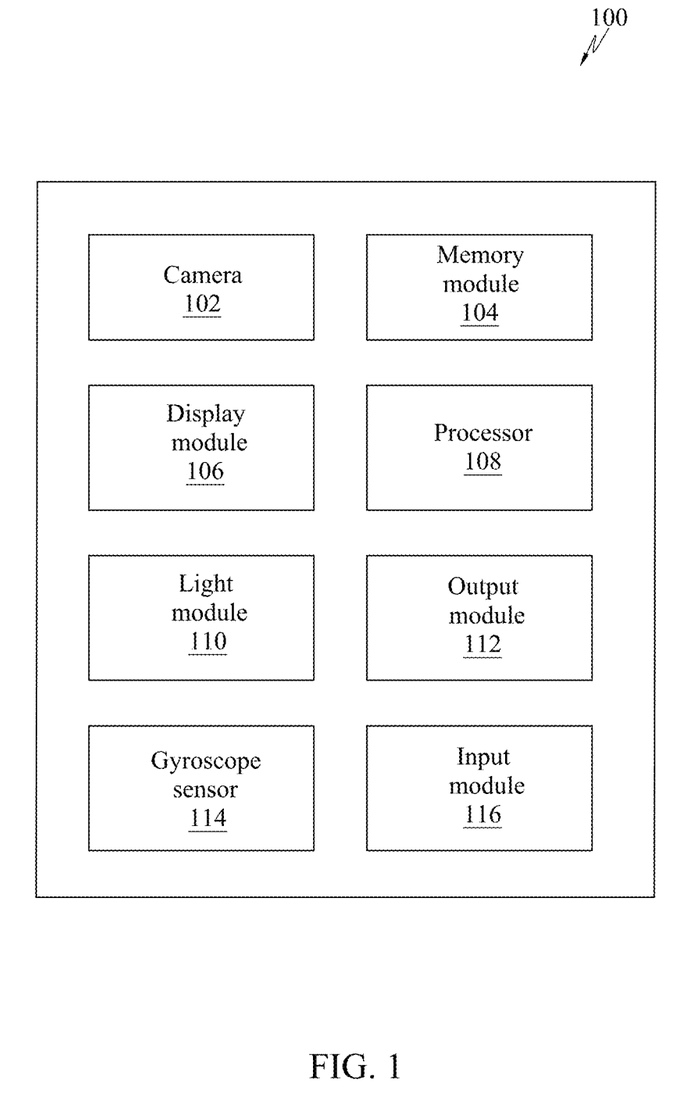
FIG. 1 illustrates an exemplary block diagram of various modules of an image capturing device 100, in accordance with an embodiment.

Referring to the figures, and more particularly to the FIG. 1, an exemplary block diagram of various modules of an image capturing device 100 is illustrated. The image capturing device 100 may be a smartphone, tablet, PC or a dedicated camera comprising the modules. The image capturing device 100 may include a camera 102, a memory module 104, a display module 106, a processor 108, a light module 110, an output module 112 and a gyroscope sensor 114.

The camera 102 in the image capture device 100 may be capable of capturing images of a security label through a common photographic optical lens system. The camera 102 may also possess scanning capabilities.

The memory module 104 in the image capturing device 100 may include a permanent memory such as hard disk drive, may be configured to store data, and executable program instructions that are implemented by a processor 108. The memory module 104 may be implemented in the form of a primary and a secondary memory. The memory module 104 may store additional data and program instructions that are loadable and executable on the processor 108, as well as data generated during the execution of these programs. Further, the memory module 104 may be volatile memory, such as random-access memory and/or a disk drive, or non-volatile memory. The memory module 104 may comprise of removable memory such as a Compact Flash card, Memory Stick, Smart Media, Multimedia Card, Secure Digital memory, or any other memory storage that exists currently or may exist in the future.

The display module 106 in the image capturing device 100 may be configured to display content. The display module 106 may be of any display type known in the art, for example, Liquid Crystal Displays (LCD), Light Emitting Diode Displays (LED), Cathode Ray Tube Displays (CRT), Orthogonal Liquid Crystal Displays (OLCD) or any other type of display currently existing or which may exist in the future. The display module 106 may be used to display images being captured by the camera 102 of the image capturing device 100. The display module 106 may also display the result of authentication and may also display instructions to a user operating the image capturing device 100.

The processor 108 in the image capturing device 100 may be implemented in the form of one or more processors or may be implemented as appropriate in hardware, computer-executable instructions, firmware, or combinations thereof. Computer-executable instruction or firmware implementations of the processor 108 may include computer-executable or machine-executable instructions written in any suitable programming language to perform the various functions described.

The light module 110 in the image capturing device 100 may be used to generate different lighting conditions under which images may be captures. The light module 110 may be used to illuminate white LED for flash applications. The flashlight of the light module 110 may be turned ON and OFF automatically to obtain images of the security label.

The output module 112 in the image capturing device 100 may provide an interface for the image capturing device 100 to present output via output devices such as speakers, printer or additional display, among other.

The input module 116 in the image capturing device 100 may provide an interface for a user to provide input to the image capturing device 100. The inout module may include one or more of a touchscreen, a mouse or a microphone, among others.

The gyroscope sensor 114 in the image capturing device 100 may measure orientation of the image capturing device 100.

Example Method for Automated Authentication of a Security Label

Figure 2A:
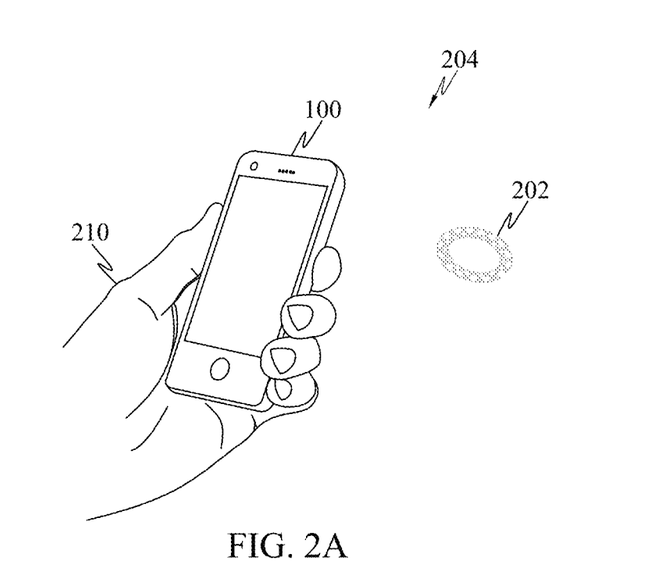
FIGS. 2A and 2B illustrate capturing images of a security label 202 under a first lighting condition 204 and a second lighting condition 206, respectively, in accordance with an embodiment.
Figure 2B:
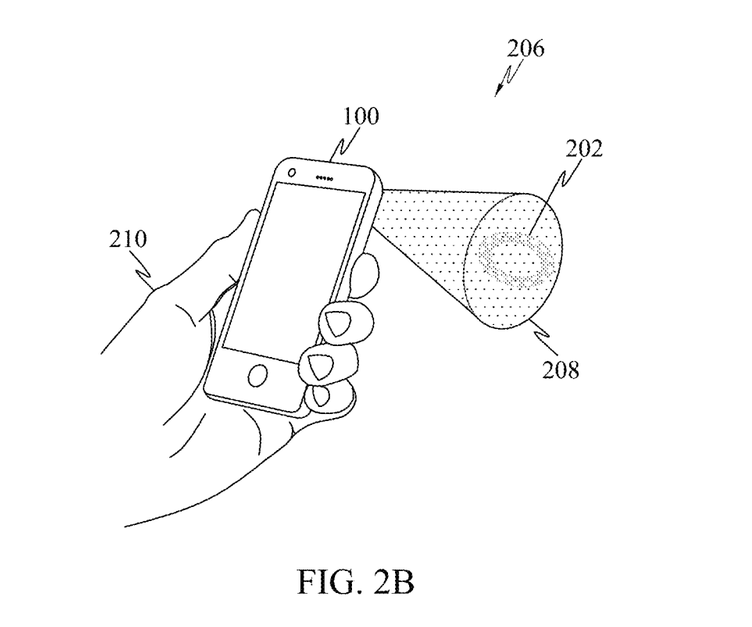

FIG. 2A and FIG. 2B illustrate capturing images of a security label 202 under a first lighting condition 204 and a second lighting condition 206, respectively, in accordance with an embodiment. The image capturing device 100 is held by a user 210 in proximity of the security label 202. In the first lighting condition 204, the flash light 208 in the image capturing device 100 may be in OFF condition. The security label 202 may be exposed to an ambient light. In the second lighting condition 206, the flash light 208 in the image capturing device 100 may be turned ON automatically, without an aid of the user 210. Under the second lighting condition 206, the security label 202 may be exposed to flash light 208. It may be noted that the colour profile of the label 202 in the captured image would be different in the first lighting condition 204 and the second lighting condition 206.

In an embodiment, the flash light 208 may be turned ON under the first lighting condition 204 and the flashlight 208 may be turned OFF in the second lighting condition 206 respectively, by the image capturing device 100.

Figure 3:
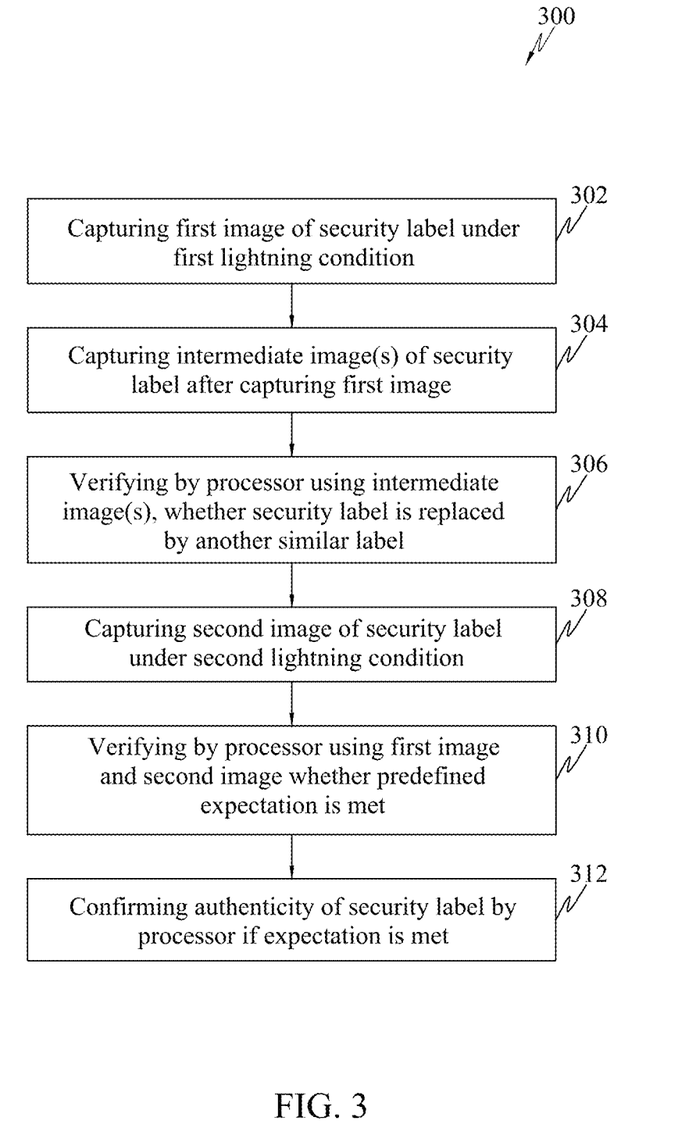
FIG. 3 is a flowchart 300 illustrating a method 300 for automated authentication of the security label 202, in accordance with an embodiment.

Now, referring to a flowchart 300, a method 300 for automated authentication of the security label 202 is illustrated, in accordance with an embodiment.

Referring to step 302, the image capturing device 100 captures a first image of the security label 202 under a first lighting condition 204. In an embodiment, the flash light 208 may be OFF or automatically turned OFF (if ON) without explicit instructions from the user 210.

Referring to step 304, once the first image is captured under the first lighting condition 204, the image capturing device 100 may capture at least one intermediate image before capturing a second image under the second lighting condition 206. The intermediate image may be captured automatically by the image capturing device 100 after capturing the first image, without explicit instructions from the user 210.

In an embodiment, a plurality of intermediate images may be captured by the image capturing device 100 at a rate of 10-12 image frames per second, as an example. The continuous capturing of intermediate image frames may be helpful in determining whether, in between the first and the second image, the security label 202 has been changed. It may be appreciated that in case the security label 202 is taken out and replaced by another label, then in some of the frames, the security label 202 would be absent or the movement of the security label 202 will be determined automatically using image processing techniques, wherein changes in pixels between the frames can be identified.

Referring to step 306, the processor 108 may verify using intermediate images, whether the security label 202 is replaced by another label. The processor 108 may also verify using the intermediate image, whether, relative spatial orientation between the camera 202 of the image capturing device 100 and the security label 202 has changed. The relative spatial orientation between the camera 202 of the image capturing device 100 may be intentionally changed between the switching between the light OFF and light ON condition. The plurality of intermediate images may be captured while the induction of false tilt. The processor 108 may verify, using intermediate images if the spatial orientation has been changed between the camera 102 of the image capturing device 100 and the security label 202.

It should be appreciated that, in the absence of the intermediate images, an inspector may use an authentication device to scan a first copy of the security label as it would be under the first lighting condition, and thereafter scan a second copy of the security label as it would be under the second lighting condition, thereby preventing the authentication device from ever known that it scanned two different security labels, and thereby successfully defrauding the authentication process.

Referring to step 308, a second image may be captured by the image capturing device 100 after ascertaining that the security label 202 has not been replaced, using intermediate images. The flash light 208 of the image capturing device 100 may be automatically turned ON by the image capturing device 100 to capture the second image. There may be no intervention by the user 210 in switching ON the flash light 208 of the image capturing device 100.

Referring to step 310, the processor 108 may verify using the first image and the second image, whether the predefined expectation is met.

In an embodiment, the predefined expectation may be obtaining a variation is colour profile between the first image and the second image. As an example, the first image captured under the first lighting condition 204 may be expected to generate a first colour profile, wherein, the first colour profile may include a pattern of colours in predefined expected areas. Similarly, the second image captured under the second lighting condition 206 may be expected to generate a second colour profile, wherein, the second colour profile may include another pattern of colours in predefined expected areas. The processor 108 may compare difference in colour patterns between the first colour profile of the first image and the second colour profile of the second image to verify, whether, the pre-defined expectations are met or not.

In another embodiment, the predefined expectation may be met if the first image captured under the first lighting condition 204, matches at least to a preconfigured extent, with one or more benchmark images corresponding to the first lighting condition 204. Likewise, the processor may check if the second image captured under the second lighting condition 206, matches at least to a preconfigured extent, with one or more benchmark images corresponding to the second lighting condition 206. The benchmark images may be expected image patterns corresponding to the lighting conditions. The benchmark images corresponding to the first lighting condition 204 may be used by the processor 108 to verify the first image captured under the first lighting condition 204. Likewise, the benchmark images corresponding to the second lighting condition 206 may be used by the processor 108 to verify the first image captured under the second lighting condition 206.

In an embodiment, processor 108 may also check whether the size of the image captured is convenient to verify the first and the second image. In case, the size is determined to be inconvenient, then instructions through the display module 106 or output module 112 may be provided to adjust the relative position between the image capturing device 100 and the security label 202.

Referring to step 312, the processor 108 may confirm the authenticity of the security label 202, by confirming, whether, the predefined expectations from the first image under the first lighting condition 204 and the second image under the second lighting condition 206, are met.

In an embodiment, the flash light 208 is OFF or may be turned OFF automatically by the image capturing device 100 to capture a first image. Subsequently, an intermediate image may be captured by the image capturing device 100. Thereafter, the flash light 208 of the image capturing device 100 may be turned ON automatically to capture a second image. The processor 108 may obtain the first image, the intermediate image and the second image. The processor 108 may verify whether the first image and the second image meeting the pre-defined expectations under the first lighting condition 204 and the second lighting condition 204 respectively. The processor 108 further verifies, using the intermediate images, that the security label 202 is not replaced by any other label. The processor 108 now may confirm the authenticity of the security label 202 if the pre-defined expectations are met for the first image under the first lighting condition 204 and the second image under the second lighting condition 206. The output module 112 may present the authentication information to the user 210.

Another Example Method for Automated Authentication of a Security Label

Figure 4:
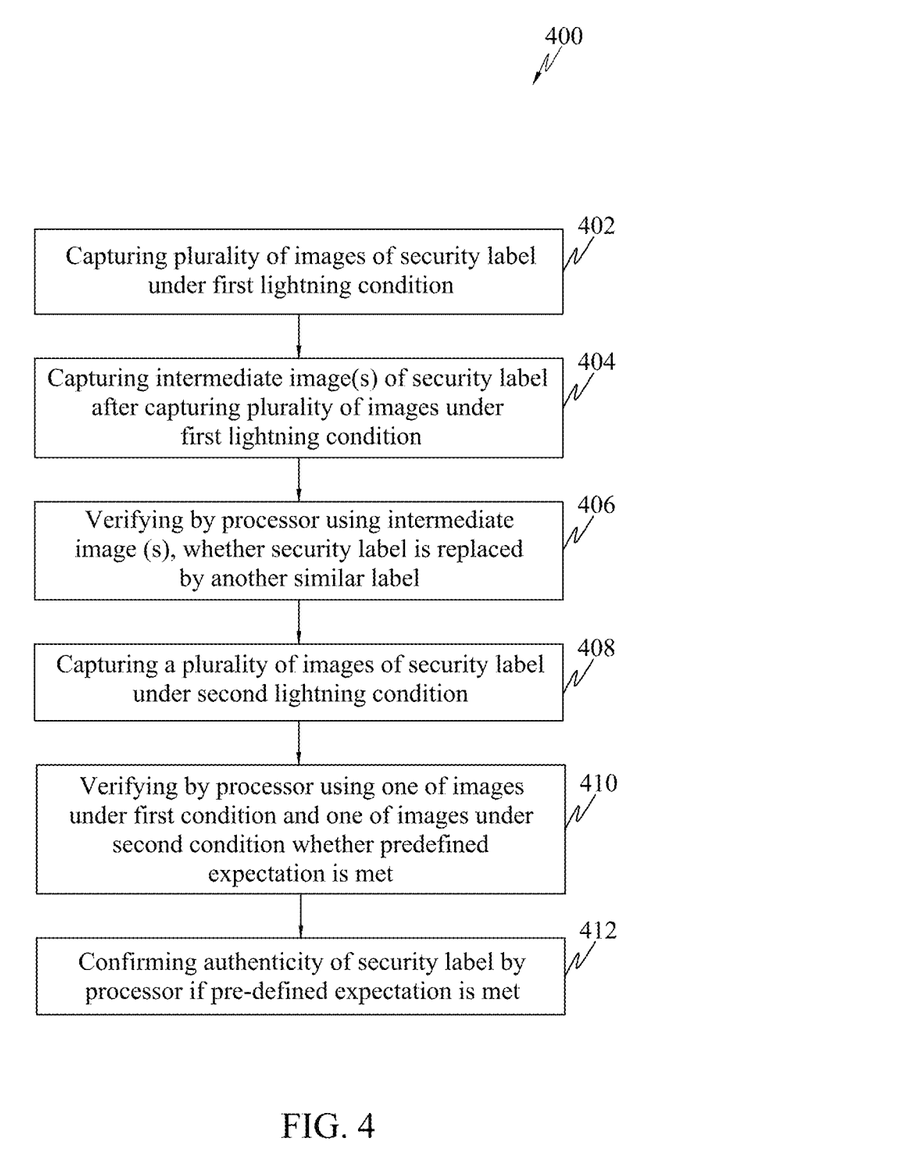
FIG. 4 is a flowchart 400 illustrating a method 400 for automated authentication of the security label 202, in accordance with an embodiment.

FIG. 4 is a flowchart 400 illustrating a method 400 for automated authentication of the security label 202, in accordance with an embodiment.

Referring to step 402, the image capturing device 100 may capture a plurality of images of the security label 202 under the first lighting condition 204.

Referring to step 404, at least an intermediate image or plurality of intermediate images of the security label 202 may be captured, after capturing the plurality of images under the first lighting condition 204.

Referring to step 406, the intermediate image or plurality of intermediate images may be verified by the processor 108 to ensure that the security label 202 is not replaced by any other label.

Referring to step 408, once the processor 108 complete its verification using the intermediate image or plurality of intermediate images, the flash light 208 of the image capturing device 100 may automatically turns ON to capture a plurality of images under the second lighting condition 206.

Referring to step 410, the processor 108 may verify using at least one of the plurality of images captured under the first lighting condition 204 and at least one of the plurality of images captured under the second lighting condition 206, whether, the predefined expectations from at least one of the plurality of images under the first lighting condition 204 and at least one of the plurality of images under the second lighting condition 206 are met.

Referring to step 412, the processor may confirm the authenticity of the security label 202, by confirming the predefined expectations from the at least on of plurality of images captured under the first lighting condition 204 and the at least one of the plurality of images captured under the second lighting condition 206, are met.

Yet Another Example Method for Automated Authentication of a Security Label

Figure 5A:
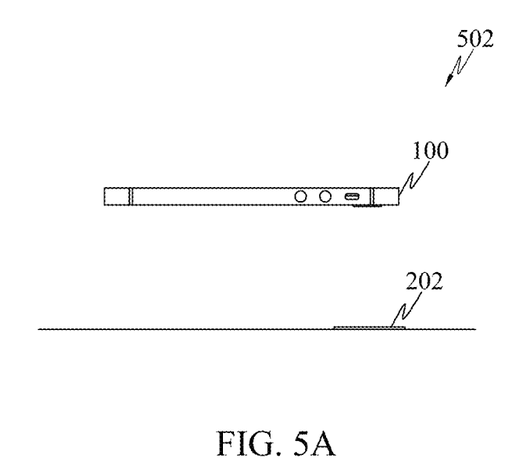
FIGS. 5A and 5B illustrate capturing images of the security label 202 under a first condition 502 and a second condition 504 respectively, in accordance with an embodiment.
Figure 5B:
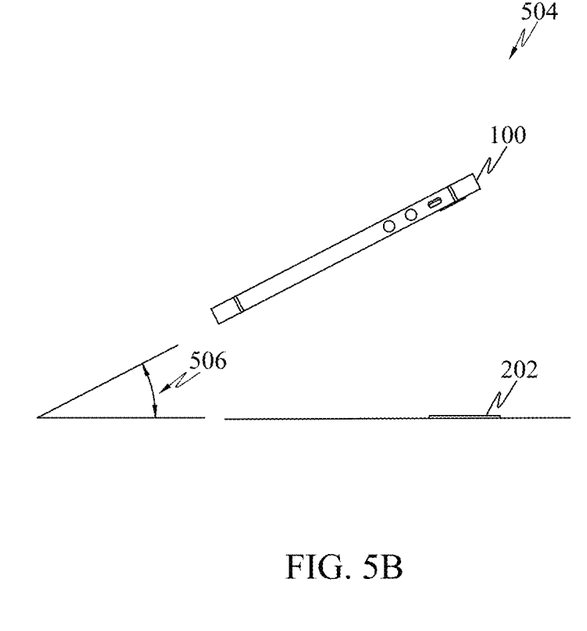

FIG. 5A and FIG. 5B illustrate capturing images of the security label 202 under a first condition 502 and a second condition 504 respectively, in accordance with an embodiment.

FIG. 5A illustrates the security label 202 and the image capturing device 100 positioned parallel to each other, that is, the camera 102 of the image capturing device 100 is at around zero degrees relative to the security label 202.

In an embodiment, the camera 102 of the image capturing device 100 may be allowed to be tilted to certain range which is about ±5 degrees, relative to the security label 202, under the first condition 502. The gyroscope sensor 114, configured in image capturing device 100 may measure tilt of the image capturing device 100 with respect to the security label 202. If the camera 102 of the image capturing device 100 is tilted beyond the pre-defined angle range of ±5 degrees, the gyroscope sensor 114 may measure the tilt and the processor 108 may obtain the corresponding measure of tilt of the camera 102 of the image capturing device 100. The processor 108 may communicate the information to the user 210 via the output module 106 by instructing the user 210 to adjust the position of the camera 102 of the image capturing device 100 relative to the security label 202.

FIG. 5B illustrates the second condition 504, wherein, the camera 102 of the image capturing device 100 may be induced a tilt 506 relative to the security label 202. The tilt 506 may correspond to a pre-defined angle range of ±25-35 degrees relative to the security label 202. The gyroscope sensor 114 may be configured to measure the tilt 506 of the camera 102. The corresponding measure of the tilt 506 may be communicated to the processor 108 by the gyroscope sensor 114. If the processor 108 detects that the tilt 506 doesn't fall under the pre-defined range of ±25-35 degrees, the processor 108 may instruct the user 210 to adjust the position of the camera 102 of the image capturing device 100 relative to the security label 202. It may be noted that the colour profile of the label 202 in the captured image would be different in the first condition 504 and the second condition 506.

Figure 6:
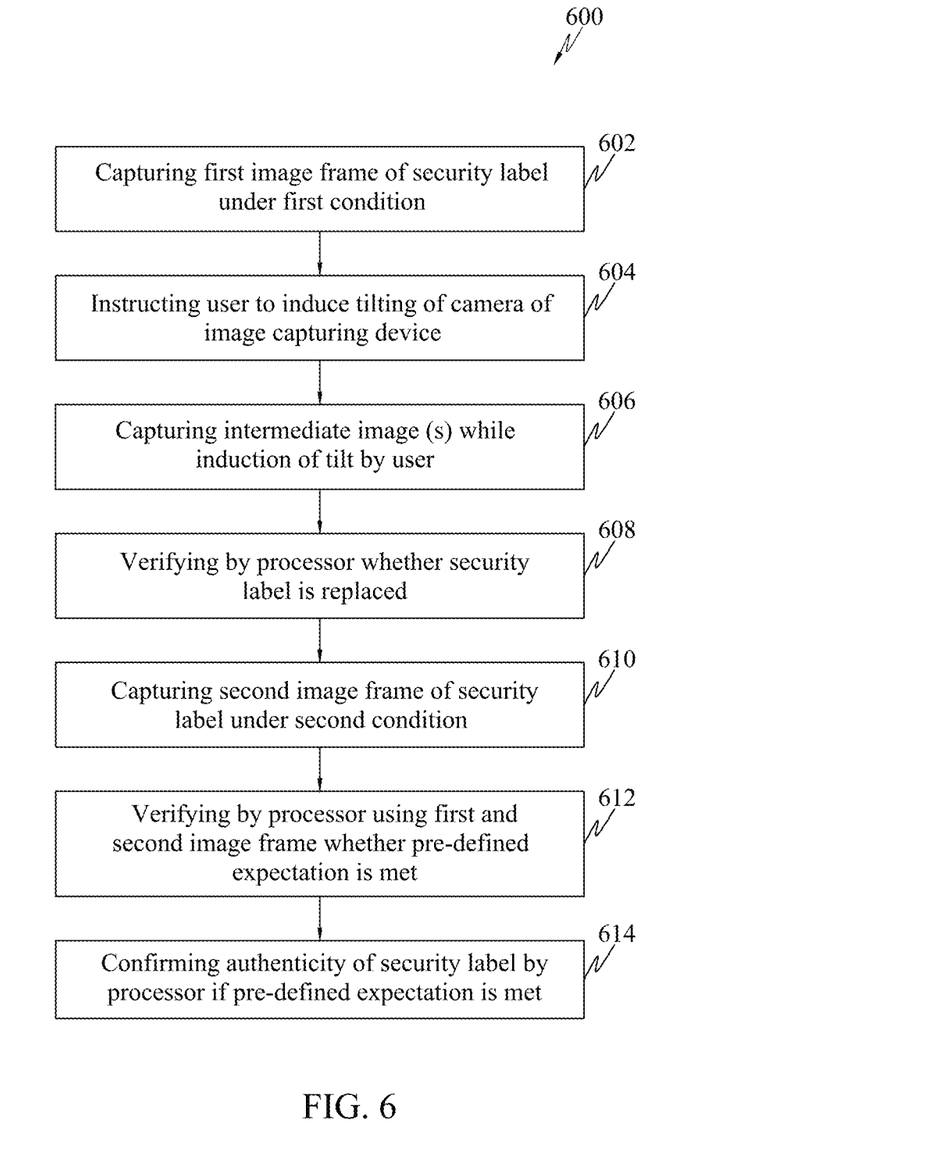
FIG. 6 is a flowchart 600 illustrating a method 600 for automated authentication of the security label 202, in accordance with an embodiment.

FIG. 6 is a flowchart 600 illustrating a method 600 for automated authentication of the security label 202, in accordance with an embodiment.

Referring to step 602, the image capturing device 100 may capture a first image frame of the security label 202 under the first condition 502. The first image frame may be captured at a specific view angle (not shown in figure) from the image capturing device 100, under the first condition 502. The gyroscope sensor 114 may measure angle between the camera 102 of the image capturing device 100 and the security label 202. The corresponding measure may be communicated to the processor 108.

Referring to step 604, the image capturing device 100 may instruct the user 210 to induce a tilt 506 of the camera 102 of the image capturing device 100 with respect to the security label 202. The gyroscope sensor 114 may measure tilt 506 and communicate to the processor 108.

Referring to step 606, while the tilt 506 is being induced by the user 210 of the image capturing device 100, the image capturing device 100 may automatically start capturing one or more intermediate images. The plurality of intermediate images may be captured by the image capturing device 100 at a rate of 10-12 image frames per second, as an example. The continuous capturing of intermediate image frames may be helpful in determining whether, while inducing the tilt 506, the security label 202 has been changed. It may be appreciated that in case the security label 202 is taken out and replaced by another label, then in some of the frames, the security label 202 would be absent or the movement of the security label 202 will be determined automatically using image processing techniques, wherein changes in pixels between the frames can be identified.

Referring to step 608, the processor 108 may verify using intermediate images, whether the security label 202 is replaced by another label. The processor 108 may also verify using the intermediate images, whether, relative spatial orientation between the image capturing device 100 and the security label 202 has changed.

Referring to step 610, once the verification using the intermediate image is completed by the processor 108, the image capturing device 100 may capture a second image frame of the security label 202 under the second condition 504. Under the second condition 504, the camera 102 of the image capturing device 100 may be tilted by the user 210 to induce the tilt 506. As the tilt 506 is induced, view angle from the camera 102 of the image capturing device 100 corresponding to the tilt 506 angle may also vary, relative to the security label 202.

Referring to step 612, the processor 108 may verify using the first image and the second image, whether the predefined expectation is met.

In an embodiment, the predefined expectation may be obtaining a variation is colour profile between the first image and the second image. As an example, the first image captured under the first condition 504 may be expected to generate a first colour profile for a specific view angle of the camera 102, wherein, the first colour profile may include a pattern of colours in predefined expected areas, when viewed from the specific view angle of the camera 102. Similarly, the second image captured under the second condition 506 may be expected to generate a second colour profile for a specific view angle of the camera 102, wherein, the second colour profile may include another pattern of colours in predefined expected areas, when viewed from the specific view angle of the camera 102. The processor 108 may compare difference in colour patterns between the first colour profile of the first image and the second colour profile of the second image to verify, whether, the pre-defined expectations are met or not.

In another embodiment, the predefined expectation may be met if the first image captured under the first condition 504, matches at least to a preconfigured extent, with one or more benchmark images corresponding to pre-defined view angles of the camera 102 under the first condition 504. Likewise, the processor may check if the second image captured under the second condition 506, matches at least to a preconfigured extent, with one or more benchmark images corresponding to pre-defined view angles of the camera 102 under the second condition 504. The benchmark images may be expected image patterns corresponding to the lighting conditions for pre-defined view angles of the camera 102. The benchmark images corresponding to the first condition 504 may be used by the processor 108 to verify the first image captured under the first condition 504. Likewise, the benchmark images corresponding to the second condition 506 may be used by the processor 108 to verify the first image captured under the second condition 506.

In an embodiment, processor 108 may also check whether the quality of the image captured is sufficient to verify the first and the second image. In case, the quality is determined to be insufficient, then instructions through the display module 106 or output module 112 may be provided to adjust the relative position between the image capturing device 100 and the security label 202.

Referring to step 614, the processor 108 may confirm the authenticity of the security label 202, by confirming, whether, the predefined expectations from the first image under the first condition 504 and the second image under the second condition 506, are met.

Still Another Example Method for Automated Authentication of a Security Label

Figure 7:
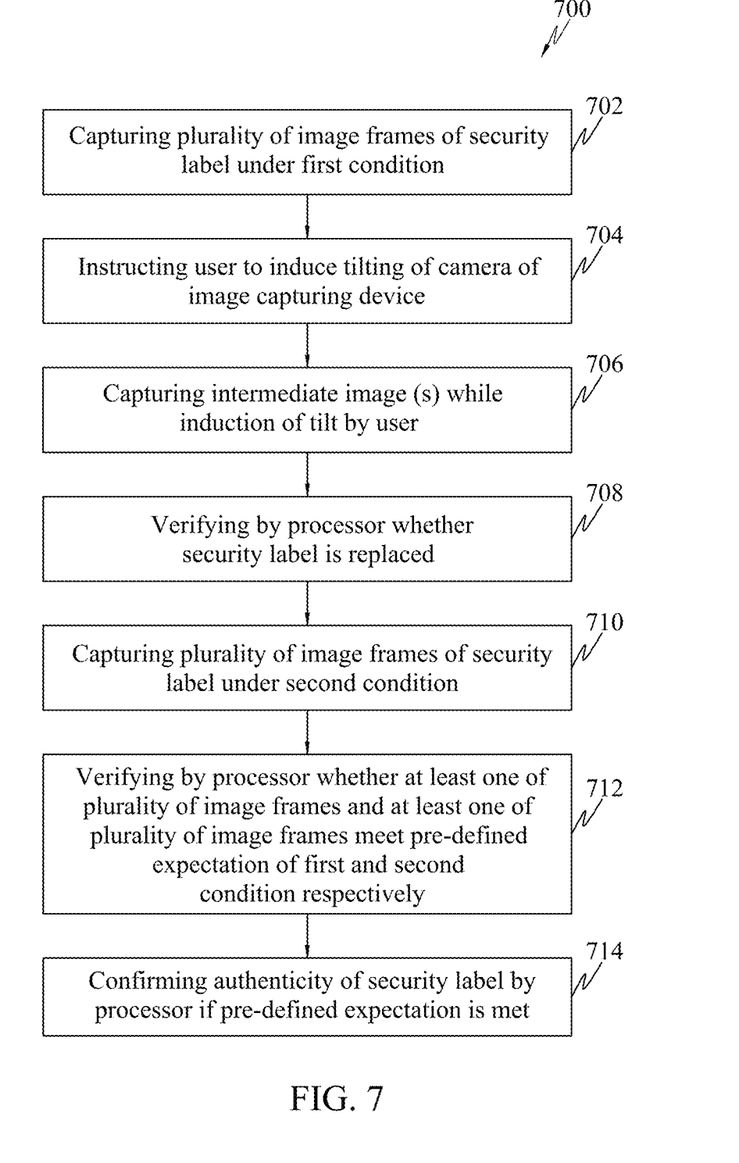
FIG. 7 is a flowchart 700 illustrating a method 700 for automated authentication of the security label 202, in accordance with an embodiment.

FIG. 7 is a flowchart 700 illustrating a method 700 for automated authentication of the security label 202, in accordance with an embodiment.

Referring to step 702, the image capturing device 100 may capture a plurality of image frames of the security label 202, under the first condition 502, which may be determined by the gyroscope sensor 114. The gyroscope sensor 114 may measure angles between the camera 102 of the image capturing device 100 and the security label 202 for the plurality of image frames. For measuring angles one can use perspective of security label image without any limitation. The corresponding measure may be communicated to the processor 108.

Referring to step 704, the image capturing device 100 may instruct the user 210 to induce a tilt 506 of the camera 102 of the image capturing device 100 with respect to the security label 202. The gyroscope sensor 114 may measure tilt 506 of the camera 102 and communicate to the processor 108.

Referring to step 706, while the tilt 506 is being induced by the user 210 of the image capturing device 100, the image capturing device 100 may automatically start capturing one or more intermediate images.

Referring to step 708, the processor 108 may verify whether the security label 202 is replaced by another similar looking label, using the intermediate images. It may also verify whether, relative spatial orientation between the image capturing device 100 and the security label 202 has been intentionally or unintentionally changed.

Referring to step 710, the image capturing device 100 may capture a plurality of image frames of the security label 202 under the second condition 504. Under the second condition 504, the image capturing device 100 may be tilted by the user 210 to induce the tilt 506. As the tilt 506 is induced, view angle from the camera 102 of the image capturing device 100 corresponding to the tilt 506 angle may also vary, relative to the security label 202. The plurality of image frames may be captured at different view angles from the camera 102 image capturing device 100, under the second condition 504.

Referring to step 712, the processor 108 may verify, whether at least one of the plurality of image frames under the first condition 504 and at least one of the plurality of image frames under the second condition 506 meet pre-defined expectations. The gyroscope sensor 114 may measure the induced tilt 506 angle of one of the plurality of image frames and communicate to the processor 108. The processor 108 verifies, whether, the tilt 506 angle of one of the plurality of image frames falls within the pre-defined range. If it doesn't fall within the pre-defined range, the processor 108 may instruct the user 210 to adjust the image capturing device 100 either by moving away or bending the image capturing device 100 towards or away from the security label 202 to capture the second image frame.

Referring to step 714, the processor 108 may confirm the authenticity of the security label 202, by confirming, whether, the predefined expectations from the at least one of the plurality of image frames under first condition 504 and the at least one of the plurality of image frames under the second condition 506, are met. The authentication notification is sent to the user 210 via the output module 112 or the display module 106 of the image capturing device 100.

In an embodiment, a relative tilt between the camera 102 of the image capturing device 100 and security label 202 may also be induced by the user 210. The camera 102 of the image capturing device 100 may be tilted to an angle or a tilt may also be induced to the security label 202. The relative angle between the camera 102 of the image capturing device 100 and the security label 202 may be measured by the gyroscope sensor 114 or by image processing means. The processor 108 may receive measure of the relative angle and may verify if the relative tilt between the camera 102 of the image capturing device 100 and the security label 202 is as per the pre-defined angle range or not. If not, the user 210 may be intimated about making corresponding adjustments.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A method for automated authentication of a security label, the method comprising:
   capturing at least a first image of the security label under a first lighting condition, using an image capturing device;
   capturing at least a second image of the security label under a second lighting condition, using the image capturing device, wherein the first lighting condition is different from the second lighting condition;
   verifying, by a processor, using the first image and the second image whether predefined expectation is met;
   confirming, by the processor, authenticity of the security label if the expectation is met;
   capturing at least an intermediate image of the security label after capturing the first image and before capturing the second image, using the image capturing device; and
   verifying, by the processor, using at least the intermediate image, whether the security label has been changed in between capturing of the first image and the second image.

2. The method of claim 1, wherein the predefined expectation is change in colour profile between the first image and the second image.

3. The method of claim 1, wherein the predefined expectation comprises:
   matching of the first image with one or more benchmark images corresponding to the first lighting condition; and
   matching of the second image with one or more benchmark images corresponding to the second lighting condition.

4. The method according to claim 1, wherein a flash light of the image capturing device is OFF in one of the lighting conditions and the flash light of the image capturing device is ON in another of the lighting conditions to illuminate the security label with the flash light of the image capturing device.

5. The method according to claim 1, further comprising:
   capturing a plurality of images of the security label under the first lighting condition, using the image capturing device;
   capturing a plurality of images of the security label under the second lighting condition, using the image capturing device; and
   verifying, by the processor, using at least one of the images captured under the first lighting conditions and at least one of the images captured under the second lighting conditions, whether the predefined expectation is met.

6. The method according to claim 1, wherein the intermediate image is captured by image capturing device automatically in absence of explicit user input to capture the intermediate image.

7. The method according to claim 1, further comprising using the intermediate image to determine whether relative spatial orientation between a camera of the image capturing device and the security label has changed.

8. The method according to claim 1, wherein image capturing device switches to the second lighting condition and captures the second image, after capturing the first image, in absence of explicit user input to switch to the second lighting condition.

9. A method for automated authentication of a security label, the method comprising:
   capturing at least a first image of the security label under a first condition, using an image capturing device;
   capturing at least a second image of the security label under a second condition, using the image capturing device, wherein relative tilt between a camera of the image capturing device and the security label is the first condition is different from the second condition;
   verifying, by a processor, using the first image and the second image whether predefined expectation is met;
   confirming, by the processor, authenticity of the security label if the expectation is met;
   capturing at least an intermediate image of the security label after capturing the first image and before capturing the second image, using the image capturing device; and
   verifying, by the processor, using at least the intermediate image, whether the security label has been changed in between capturing of the first image and the second image.

10. The method of claim 9, wherein the predefined expectation is change in colour profile between the first image and the second image.

11. The method of claim 9, wherein the predefined expectation comprises:
    matching of the first image with one or more benchmark images corresponding to the first condition; and
    matching of the second image with one or more benchmark images corresponding to the second condition.

12. The method according to claim 9, wherein the relative tilt in at least one of the conditions is above 0 degrees and below 90 degrees.

13. The method according to claim 9, wherein the relative tilt in the first condition is within a first range and the relative tilt in the second condition is within a second range, wherein overlap between the first range and the second range is absent.

14. The method according to claim 9, further comprising:
    capturing a plurality of images of the security label under the first condition, using the image capturing device;
    capturing a plurality of images of the security label under the second condition, using the image capturing device; and
    verifying, by the processor, using at least one of the images captured under the first lighting conditions and at least one of the images captured under the second lighting conditions, whether the predefined expectation is met.

15. The method according to claim 9, wherein the intermediate image is captured by image capturing device automatically in absence of explicit user input to capture the intermediate image.

16. The method according to claim 9, wherein determining, by the processor, using the intermediate image, whether transitioning from the first condition to the second condition has occurred.

17. The method according to claim 9, wherein image capturing device captures the intermediate image in absence of explicit user input to capture the intermediate image.

18. The method according to claim 9, wherein image capturing device captures the second image, after capturing the first image, in absence of explicit user input to capture the second image.

* * * * *